Sept. 9, 1969  E. HENRY-BIABAUD  3,465,613
ENGINE AND LATERAL GEARBOX UNITS
Filed Sept. 26, 1967
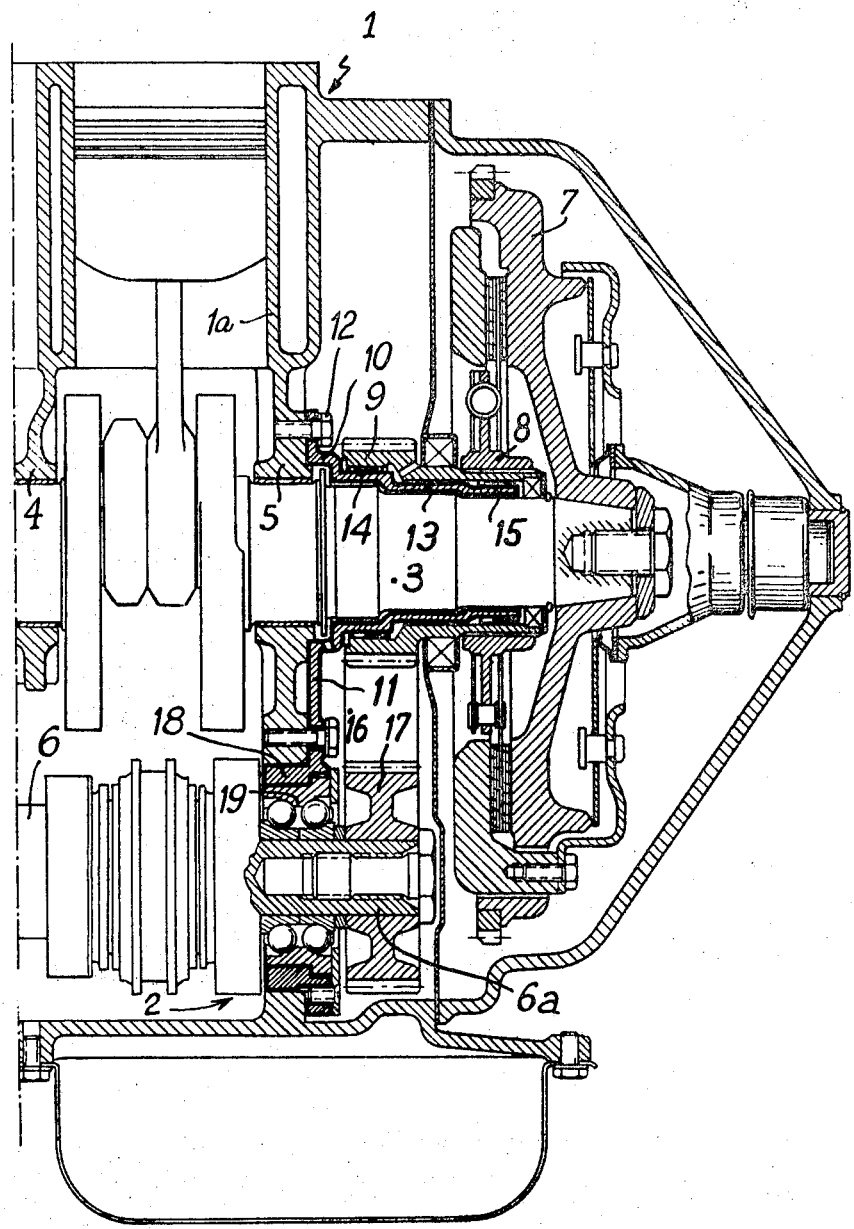

United States Patent Office 3,465,613
Patented Sept. 9, 1969

3,465,613
ENGINE AND LATERAL GEARBOX UNITS
Edmond Henry-Biabaud, Paris, France, assignor to Societe Anonyme Andre Citroen, Paris, France, a French society
Filed Sept. 26, 1967, Ser. No. 670,623
Claims priority, application France, Oct. 13, 1966, 79,820
Int. Cl. F16h 57/02, 37/08
U.S. Cl. 74—606      2 Claims

ABSTRACT OF THE DISCLOSURE

This invention relates to an engine and lateral gearbox unit and consists in the provision of a casing to surround a part of the engine crankshaft, which casing comprises a sill firmly fixed to the outside of the engine casing and at least one centering bearing is located concentrically of the general axis of the crankshaft. A first pinion is mounted on the centering bearing for transmitting the movement of the crankshaft so as to be freely rotatable and the sill is provided with at least one other centering bearing parallel to the first one from which it is spaced by a predetermined amount. The second bearing supports a further pinion of the transmission which connects the crankshaft to the input shaft of the gearbox.

---

Some automobile vehicles have engines which are fitted with a so-called lateral gearbox, i.e., with a gearbox disposed to one side of or underneath the engine. The primary shaft, known as the input shaft, of this box is then generally parallel to the axis of the bearings of the crankshaft.

The transmission of power between the crankshaft and the input shaft of the box is generally effected by a group of three successive pinions, the first of which is mounted concentrically to the crankshaft and the last of which is fixed to the input shaft.

The first pinion is free to rotate about the crankshaft to which it may, if desired, be securely connected by a clutch.

Due to its direct centering on the crankshaft, the first pinion is subjected to the same radial movements as the part of the crankshaft on which it rests. This results in a defective engagement with the second, intermediate pinion, and a rapid wear and tear of the cooperating teeth.

It has been proposed to remedy this disadvantage by rotating the first pinion, not by means of the crankshaft itself, but by an auxiliary casing externally connected to the casing of the engine. This auxiliary casing at the same time envelops a part of the clutch and has a bearing which is coaxial to the bearings of the crankshaft and by means of which the first pinion is guided.

However, it is difficult initially to effect alignment of these bearings. Morover, the correct alignment is rarely maintained afterwards. This is due to the fact that the auxiliary casing must be easily dismountable in order to give access to the clutch. This has to be dismounted during the lifetime of the vehicle and, because of this, may easily be taken off center.

The present invention has for an object to protect all the transmission pinions and, more particularly, that which is concentric to the axis of the crankshaft, from the transverse vibrations of the latter, by providing a novel assembly means which does not have the above mentioned defect.

The present invention also has for an object a precise and constant geometry, with regard to the spacing and parallel relationship of the axes of these transmission pinions.

Thus, the quality of the transmission of the movement is improved.

The invention consists in an engine and lateral gearbox unit, incorporating pinions for transmitting the movement between the engine crankshaft and the input shaft of the gearbox, wherein a casing surrounds a part of said crankshaft, said casing comprising a sill which is firmly fixed to the outside, of said engine casing, and at least one centering bearing is located concentrically to the general axis of said crankshaft and on which a first pinion for transmitting the movement of said crankshaft is freely rotatably mounted, and wherein said sill is provided with at least one other centering bearing parallel to said first bearing, from which it is spaced by a predetermined amount, said second bearing supporting a further pinion of the transmission which connects said crankshaft to said input shaft of the gearbox.

Another object of the invention is to minimise or substantially eliminate the effects of temperature variations over the distances between axes of the pinions. Thus, the quality of the transmission of the movement is maintained despite modifications of the operational conditions.

To this end, the casing is made of a material whose coefficient of expansion is lower than that of light alloys such as alloys of aluminum of magnesium.

In order that the invention may be more readily understood, reference now will be made to the accompanying drawing which shows, by way of example, an elevational view, in vertical section, of part of an engine and a gearbox, two of the transmission pinions of which are assembled in accordance with the invention.

In the drawing, the engine is designated by the general reference 1. The gearbox, designated by the general reference 2, is located in the same casing, beneath the crankshaft 3. The latter is mounted by a plurality of bearings, only two of which are shown at 4 and 5.

The drawing shows only one end of the input shaft 6 of the gearbox. The output shaft, engaging with a differential, is located in front of the plane of the figure.

The end of the crankshaft 3 is securely fixed to the driving element 7 of a friction clutch whose driven element 8 is fixed to an extension of a first pinion 9.

The crankshaft 3 and the pinion 9 are securely connectable or may be separated from one another as desired, by means of the clutch, as is conventional in this art. Under these conditions, this pinion 9 is not directly keyed to the crankshaft. When one speaks of the transmission of power between the latter and the input shaft 6 of the gearbox, it is understood that this generally takes place by means of a clutch, as has been illustrated.

According to the invention, a part of the crankshaft 3 is, at the output of the bearing 5, surrounded by a casing 10. This casing comprises a sill 11, which is rigidly secured by screws 12, to the casing wall 1a of the engine, and a casing 13 which preferably follows the shape of the crankshaft at this point.

The internal surface of the casing 13 is spaced from the crankshaft. Its external surface presents two centering bearings 14, 15, separated in the axial direction, which support and rotate the pinion 9 which extends, at one end, as far as the element 8 of the clutch.

It will be noted that the pinion 9 is accurately centered on the casing 13. The latter, due in particular to the proximity of the sill 11 and the bearing 5, may easily be centered accurately with respect to the axis of the bearings 4, 5, which is also the general axis of the crankshaft. Consequently, the pinion 9 is mounted concentrically and definitely about the crankshaft 3, without being subjected to its radial displacements.

In this example, the pinion 9 engages with a second intermediate pinion 16, outside of the plane of the FIG- URE 1, which itself engages with a third pinion 17 fixed to the end of the input shaft 6 of the gearbox.

In accordance with the invention, the sill 11 extends toward the gearbox 2. It is in fact provided with one or more other centering bearings, radially spaced from the bearings 14 and 15, the axis or axes of which are parallel to the axis of these latter. This or these new bearings serve to rotate one or more other pinions which engage with the pinion 9.

In the embodiment shown, the sill 11 is extended downwardly and is provided with a supplementary bearing 18 opposed to the bearings 14 and 15. The supplementary bearing 18 is adjusted in the bearing of the input shaft 6 of the gearbox and it holds the ball-bearing 19 of the shaft 6 inside the sill 11. On the projecting end 6a of the shaft 6 is mounted the third pinion 17. The latter is, therefore, indirectly supported by the casing 13. Of course, one could direct the bearing 18 in the same section as the bearings 14, 15. The pinion 17 would then be directly supported by this bearing 18.

This assembly means is particularly advantageous when the casing of the engine is made of light aluminium; the whole of the casing may be manufactured from a material with a lower coefficient of expansion (for example steel or cast iron). The distance between axes of the two pinions is then strictly established and it is less likely to vary because of changes in temperature.

It will be apparent that various modifications may be made to the shape of the members and to their relative dispositions; the invention is therefore not limited to the described and shown embodiment but covers all the modifications or equivalents embraced by the appendant claims.

What I claim:

1. An engine and lateral gearbox unit, incorporating pinions for transmitting the movement between the engine crankshaft and the input shaft of the gearbox, wherein a casing surrounds a part of said crankshaft, said casing comprising a sill which is firmly fixed to the outside of said engine casing and said casing supporting at least one centering bearing which is located concentrically to the general axis of said crankshaft and on which a first pinion for transmitting the movement of said crankshaft is freely rotatably mounted, and wherein said sill is provided with at least one other centering bearing parallel to said first bearing, from which it is spaced by a predetermined amount, said second bearing supporting a further pinion of the transmission which connects said crankshaft to said input shaft of the gearbox.

2. A unit according to claim 1, wherein said casing is made from a material whose coefficient of heat expansion is lower than that of light alloys such as alloys of aluminium or magnesium.

References Cited

UNITED STATES PATENTS

| | | | |
|---|---|---|---|
| 1,107,588 | 8/1914 | Christie | 192—70.14 |
| 2,913,927 | 11/1959 | Issigonis | 74—701 |
| 3,017,787 | 1/1962 | Payne | 74—701 |
| 3,350,960 | 11/1967 | Lamburn et al. | 74—701 |

FRED C. MATTERN Jr., Primary Examiner

F. D. SHOEMAKER, Assistant Examiner

U.S. Cl. X.R.

74—701